(12) United States Patent
Teli et al.

(10) Patent No.: US 9,639,411 B2
(45) Date of Patent: May 2, 2017

(54) IMPACT NOTIFICATION SYSTEM (71) Applicant: Bank of America Corporation, Charlotte, NC (US)

(72) Inventors: Vinayak Teli, Exton, PA (US); Vivek Prasad, Bridgewater, NJ (US)

(73) Assignee: Bank of America Corporation, Charlotte, NC (US)

( * ) Notice: Subject to any disclaimer, the term of this patent is extended or adjusted under 35 U.S.C. 154(b) by 163 days.

(21) Appl. No.: 14/808,234

(22) Filed: Jul. 24, 2015

(65) Prior Publication Data
US 2017/0024271 A1    Jan. 26, 2017

(51) Int. Cl.
*G06F 11/00*  (2006.01)
*G06F 11/07*  (2006.01)
*G06F 17/30*  (2006.01)

(52) U.S. Cl.
CPC ...... *G06F 11/0772* (2013.01); *G06F 11/0709* (2013.01); *G06F 11/079* (2013.01); *G06F 11/0751* (2013.01); *G06F 17/30312* (2013.01)

(58) Field of Classification Search
CPC ............. G06F 11/0772; G06F 11/0709; G06F 11/079; G06F 1/30
See application file for complete search history.

(56) References Cited

U.S. PATENT DOCUMENTS

| | | | |
|---|---|---|---|
| 7,478,404 B1 | 1/2009 | Campbell | |
| 7,536,406 B2 | 5/2009 | Haselden et al. | |
| 7,584,382 B2 | 9/2009 | Verbowski et al. | |
| 7,614,046 B2 | 11/2009 | Daniels et al. | |
| 7,631,222 B2 | 12/2009 | Hasan et al. | |
| 8,140,682 B2 | 3/2012 | Murthy et al. | |
| 8,195,340 B1* | 6/2012 | Haney | H04L 41/0833 700/295 |
| 8,201,180 B2 | 6/2012 | Briscoe et al. | |
| 8,352,914 B2 | 1/2013 | Sarkar et al. | |
| 8,457,996 B2 | 6/2013 | Winkler et al. | |
| 8,539,018 B2 | 9/2013 | Bisdikian et al. | |
| 8,543,447 B2 | 9/2013 | Corneil et al. | |

(Continued)

*Primary Examiner* — Philip Guyton
(74) *Attorney, Agent, or Firm* — Weiss & Arons LLP; Michael A. Springs, Esq.

(57) ABSTRACT

Methods for notifying, in the event of a power outage, planned maintenance activity, a plurality of stakeholders of an enterprise infrastructure. The enterprise infrastructure may include components and relationships between components. The components may include data centers, data center components, applications, application components, and any other suitable components. The relationships may include relationships between data centers and data center components, relationships between data center components and applications, relationships between applications and application components, relationships between applications and stakeholders. Methods may receive power outage information at an impact notification center. Methods may determine the effect of the power outage on remaining components of the enterprise infrastructure and based on the determination, identify affected components. Methods may notify stakeholders of the power outage, identify service components which might get impacted and perform impact analysis and capacity planning in case of any disaster event where a data center and/or location is impacted.

17 Claims, 9 Drawing Sheets

(56) References Cited

U.S. PATENT DOCUMENTS

| | | | |
|---|---|---|---|
| 8,601,446 B2 | 12/2013 | Narayanan et al. | |
| 8,719,832 B2 | 5/2014 | Briscoe et al. | |
| 8,914,499 B2 | 12/2014 | Houlihan et al. | |
| 2004/0230859 A1* | 11/2004 | Cochran | G06F 11/2058 714/2 |
| 2011/0047188 A1* | 2/2011 | Martins | G06K 19/07749 707/803 |
| 2011/0320834 A1* | 12/2011 | Ingels | G06F 1/266 713/310 |
| 2013/0097183 A1* | 4/2013 | McCracken | G06F 11/079 707/748 |
| 2013/0346786 A1* | 12/2013 | Thiel | G06F 11/0709 714/2 |
| 2014/0380488 A1 | 12/2014 | Datta Ray et al. | |

* cited by examiner

INAT

Database Impacted Projects [Export data]

| Projects | Database(s) | Readonly Databases(s) |
|---|---|---|
| som.cto1 | DAL | SAP |
| som.cto2 | SOA | DAL, SAP |
| som.cto3 | | DAL, SOA |
| som.cto4 | | SAP |

Grid Engine/Scheduler Impacted Projects [Export data]

| Grid Engine/Scheduler | Project(s) |
|---|---|
| SOM-GRID1 | som.cto3 |
| SOM-GRID2 | som.cto8 |
| SOM-GRID1, SOM-GRID2 | som.cto9 |

Pub/Sub Server Impacted Projects [Export data]

| Project(s) | Pub/Sub instance |
|---|---|
| som.cto4 | pub-sub-nyc |
| som.cto7 | pub-sub-ct |
| som.ctoX | pub-sub-dal |

Select Day(s) [Saturday ▼]  Prod/Non-Prod [Production ▼]  Start Time(EST) [00:00]  End Time(EST) [06:00]  [Filter Results]

Jobs Using Servers & Classes Excluding Manual & Disabled Jobs  [Export data]

| Job Name | Project | Start Time | Fails After | Last Run | Runs On | Level | Contacts |
|---|---|---|---|---|---|---|---|
| /prod/cto/abc/job1 | smo.cto1 | 00:00 EST | 23:59 EST | 2015-07-20 | Mon, Tue, Wed, Thu, Fri, Sat | 2 | dal@abc.com |
| /prod/cto/abc/job2 | smo.cto1 | 01:30 EST | 16:00 EST | 2015-07-20 | Mon, Tue, Wed, Thu, Fri, Sat | 2 | dal@abc.com |
| /prod/cto/abc/job6 | smo.cto1 | 06:00 UTC | 10:00 UTC | 2015-07-20 | Mon, Tue, Wed, Thu, Fri, Sat | 2 | dal@abc.com |
| /prod/cto/abc/job9 | smo.cto1 | 05:00 GMT | 09:00 EST | 2015-07-20 | Mon, Tue, Wed, Thu, Fri, Sat | 2 | dal@abc.com |
| /prod/cto/xyz/job2 | smo.cto3 | 04:00 EST | 23:00 EST | 2015-07-18 | Sat | 3 | dal@abc.com |
| /prod/cto/xyz/job6 | smo.cto3 | 01:00 EST | 23:59 EST | 2015-07-18 | Sat | 3 | cos@abc.com |
| /prod/cto/int/job1 | smo.cto4 | 00:15 EST | 23:59 EST | 2015-07-18 | Sat | 4 | cos@abc.com |
| /prod/cto/ppl/app | smo.ctoX | 02:30 EST | 06:00 EST | 2015-07-17 | Fri, Sat | 3 | xyz@abc.com |

IMPACT NOTIFICATION SYSTEM

FIELD OF TECHNOLOGY

This invention relates to Information Technology ("IT") infrastructure. Specifically, this invention relates to impact notification systems within IT infrastructure.

BACKGROUND OF THE DISCLOSURE

Often, the IT portions of entities, referred to herein, in the alternative, as enterprises, typically include many components. The components may include applications, application servers, infrastructure components, servers and any other suitable components. The components may be inter-related. The components may depend on, or influence, many other components within the enterprise.

At any time, a component, or group of components, may incur a power outage, experience scheduled maintenance downtime or endure any other outage. The remaining components may encounter technical difficulties because of their relationship with the component which incurred the outage.

Conventionally, it has been challenging to assess the extent of the impact of the outage and the dependencies of each component included within larger IT enterprises. The challenge becomes even greater when a many-to-many relationship exists between server components and application components. Therefore, there is a need for an impact notification system.

SUMMARY OF THE INVENTION

The impact notification system may provide impact and dependency analysis. The impact and dependency analysis may assess any planned or unplanned component outage.

Impact analysis and dependency notification may enable granular level impact assessment of IT outages, maintenance activity scheduling, business continuity planning, infrastructure component dependencies, application component dependencies, infrastructure planning and any other suitable instance within an enterprise model.

Creation of an impact notification system may present challenges. Diversity of the components included on an IT platform may increase the level of difficulty of the aforementioned challenges. An IT platform may include silo applications. For the purposes of this application, a silo application may be understood to be an IT system which operates independently and generally does not and cannot easily interact with any other system. Because of their unique characteristics, silo applications amplify challenges associated with creation of an impact notification system.

In order to resolve the challenges relating to IT enterprises, an impact notification system, according to certain embodiments, may include a metadata mapping structure. The metadata mapping may be dynamically maintainable. The metadata mapping may be manually implemented. The metadata mapping may be a combination of dynamic maintenance and manual procedure. In a case of manual implementation, a governance model may be required to have an up to date metadata mapping.

The metadata mapping may include information and dependencies from each component in the IT infrastructure. The metadata mapping may enable the impact notification system to notify users of IT infrastructure components when a component incurs an outage.

One skilled in the art will appreciate that when a component incurs an outage, it typically can no longer notify the dependent components of the outage. Therefore, the impact notification system, utilizing metadata mapping, may be able to predict the component which incurred an outage, and notify the impacted components.

An apparatus for notification is provided. The apparatus may include a system. The system may notify a plurality of stakeholders. The stakeholders may interact with an enterprise infrastructure. The notification may be transmitted to the stakeholders in response to any kind of infrastructure outage.

The system may define a region. The region may include a plurality of data centers. The system may also include a plurality of regions. Each region in the plurality of regions may include a plurality of data centers.

Each data center may include a plurality of data center components. Each data center component may be associated with a plurality of applications. Each application may be associated with at least one data center component. Each application may be associated with a plurality of users. The plurality of users may be included in the plurality of stakeholders. Each user may be associated with at least one application. Each application may be associated with a plurality of user interfaces ("UIs"). Each application may also be associated with a plurality of processes.

It should be appreciated that one or more of the associations discussed above may be characterized as many-to-many relationships. One or more of the associations discussed above may also be characterized as one-to-many relationships. One or more of the associations discussed above may also be characterized as one-to-one relationships.

The system may also include a server metadata database. The server metadata database may receive metadata from each data center component of each data center. The metadata may identify the associated applications.

The system may also include an application metadata database. The application metadata database may receive metadata from each application. The metadata may identify the associated UIs. The metadata may also identify the associated processes. The metadata may also identify the associated users and/or user groups.

The system may include an impact notification center. The impact notification center may include a reader application program interface ("api"). The reader api may read metadata from the server metadata database. The reader api may also read metadata from the application metadata database as well as from an application component definition.

The impact notification center may include a processor. The processor may map the metadata from the three sources—i.e., from the server metadata database, the application metadata database and the application component definition.

When an application experiences a power outage, or any other outage, the impact notification center may be configured to transmit an impact notification message. The impact notification message may characterize the effect of the power outage, or other outage, on the remaining components of the system. The transmission of the impact notification message may be to the stakeholders which are associated with the application that has experienced a power outage or otherwise been interrupted.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

An apparatus for notification is provided. The apparatus may include a system. The system may notify a plurality of stakeholders. The stakeholders may interact with an enterprise infrastructure. The notification may be transmitted to the stakeholders in response to a power outage. The notification may be triggered by scheduled maintenance downtime. The notification may be triggered by any other suitable event.

The system may define a region. The region may include a plurality of data centers. The system may also include a plurality of regions. Each region in the plurality of regions may include a plurality of data centers.

Each data center may include a plurality of data center components. Each data center component may be associated with a plurality of applications. Each application may be associated with at least one data center component. Each application may be associated with a plurality of users. The plurality of users may be included in the plurality of stakeholders. Each user may be associated with at least one application. Each application may be associated with a plurality of user interfaces ("UIs"). Each application may also be associated with a plurality of processes.

It should be appreciated that one or more of the associations discussed above may be characterized as many-to-many relationships.

One or more of the associations discussed above may be characterized as one-to-many relationships. One or more of the associations discussed above may be characterized as one-to-one relationships.

The system may also include a server metadata database. The server metadata database may receive metadata from each data center component of each data center. The metadata may identify the associated applications.

The system may also include an application metadata database. The application metadata database may receive metadata from each application. The metadata may identify the associated UIs. The metadata may also identify the associated processes. The metadata may also identify the associated users and/or user groups.

The system may include an impact notification center. The impact notification center may include a reader application program interface ("api"). The reader api may read metadata from the server metadata database. The reader api may also read metadata from the application metadata database as well as from the application component definition.

The impact notification center may include a processor. The processor may map the metadata from three sources—i.e., the server metadata database, the application metadata database and the application component definition.

When an application experienced a power outage, or connectivity loss, the impact notification center may be configured to transmit an impact notification message. The impact notification message may include a start time of the outage. The impact notification message may include an end time of the outage.

The impact notification message may characterize the effect of the power outage, scheduled maintenance downtime, or connectivity loss on the remaining components of the system. The transmission of the impact notification message may be to the stakeholders/users which are associated with the application that has experienced a power outage.

The characterization may include identifying the date and time of the power outage, scheduled maintenance downtime, or connectivity loss. The characterization may include identifying whether the component that suffered an outage is associated with a production environment or a non-production environment.

The system may identify the component that has incurred an outage based on metadata mapping. The system may determine which components were associated with the outage based the identification.

The data center components may include a plurality of application servers. The data center components may include a plurality of databases. The data center components may include a plurality of publish-subscribe ("publish/subscribe") servers. The data center components may include a plurality of grid engines/schedulers.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
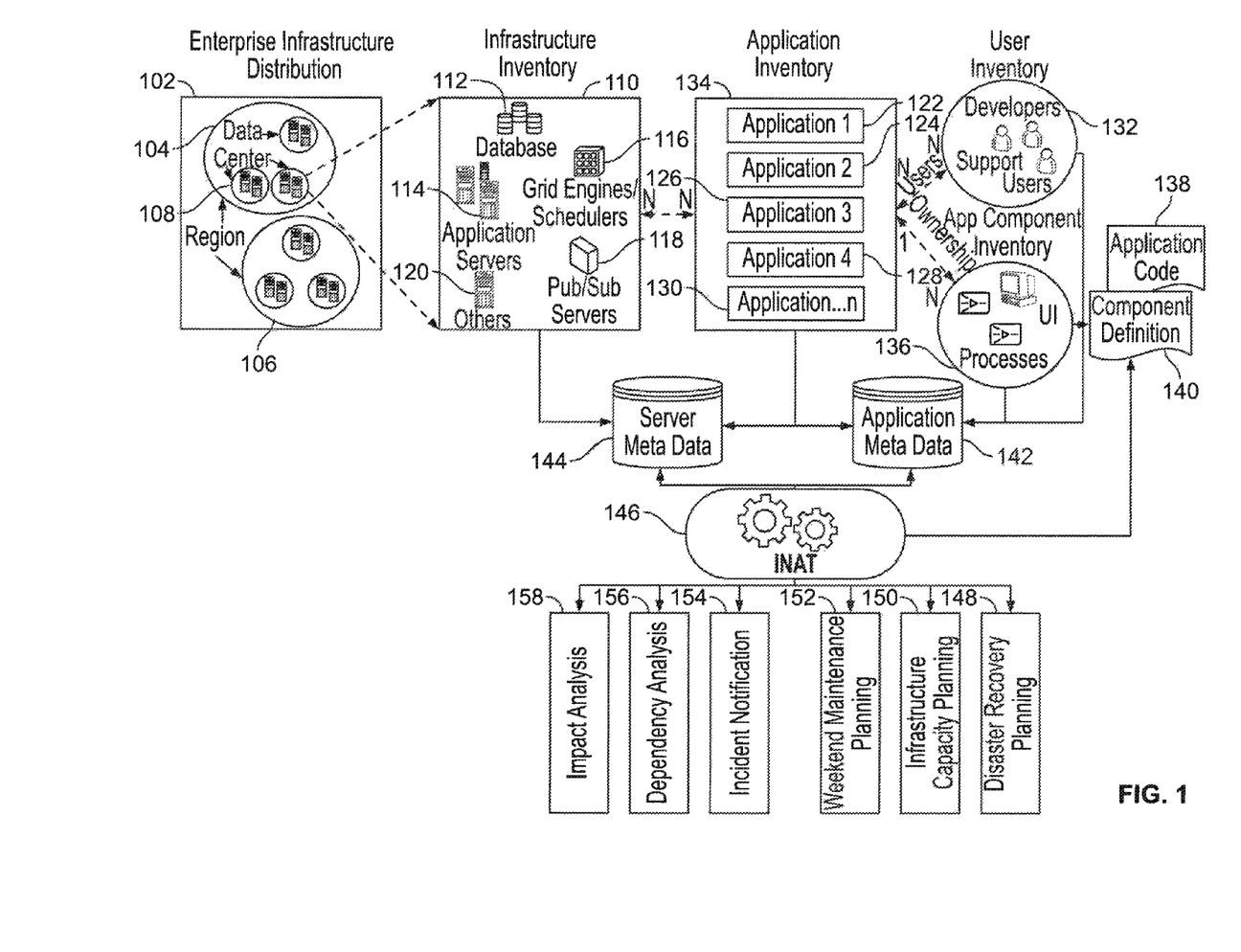
FIG. 1 shows an illustrative diagram in accordance with principles of the invention.

FIG. 1 shows an example of an architecture of an IT enterprise. Box 102 shows an enterprise infrastructure distribution. Enterprise infrastructure distribution 102 may include regions 104 and 106. Regions 104 and 106 may include a plurality of data centers. Data center 108 may be included in region 104.

Each data center may include an infrastructure inventory, or data center components, as shown at 110. Each infrastructure inventory may include databases 112, application servers 114, grid engines/schedulers 116, publish/subscribe servers and any other applicable inventory 120.

Each data center component may have an association or relationship to numerous applications, included in application inventory 134. Application inventory 134 may include application 1, as shown at 122, application 2, as shown at 124, application 3, as shown at 126, application 4 as shown at 128, until application n, as shown at 130. The applications included in application inventory 134 may have a many-to-many relationship with infrastructure inventory 110. This may be understood to mean that more than one application may be associated with more than one infrastructure inventory component. The many-to-many relationships between application inventory 134 and infrastructure inventory 110 may contribute to the complexity of the given architecture.

It should be appreciated that although FIG. 1 depicts an architecture where a many-to-many relationship exists between application inventory and infrastructure inventory, there may be other instances where one-to-one, one-to-many, and/or many-to-many relationships exist between the application inventory and the infrastructure inventory.

User inventory 132 may include developers, support, quality testers, users and any other suitable stakeholders associated with the enterprise infrastructure. A many-to-many relationship may exist between user inventory 132 and application inventory 134. Some developers, support, quality testers and/or users may interact with and/or be associated with certain applications, included in application inventory 134. It should be appreciated that any other relationships, such as the relationships described above, may exist between user inventory 132 and application inventory 134.

Application component inventory 136 may include UIs, processes and any other suitable application components. Application component inventory 136 may maintain a many-to-one relationship with application inventory 134. This may mean that each application may include and interact with its own particular application components. It should be appreciated that any other relationships, such as the relationships described above, may exist between application component inventory 136 and application inventory 134.

Application component inventory may interact with application code 138 and component definition 140. Application code 138 may include computer readable code which may interact with application component inventory. Component definition 140 may be an enterprise-specific manner of defining application components. The application components may be defined after the component undergoes modification by application code 138.

Server metadata database 144 may receive metadata pertaining to infrastructure inventory 110. Server metadata database 144 may represent data center components included in infrastructure inventory 110.

Application metadata database 142 may receive metadata pertaining to application inventory 134. Application metadata database 142 may map the applications to their respective infrastructure components, included in infrastructure inventory 110. Application metadata database 142 may also map the applications to various users, included in user inventory 132. Application metadata database 142 may also map the applications to UIs and processes included in application component inventory 136. Application metadata database 142 may also map the applications to any suitable related component.

Impact notification and analysis tool ("INAT") 146 may read metadata information from server metadata database 144 and application metadata database 142.

In some embodiments, INAT 146 may execute the metadata mapping. In these embodiments, application metadata database 142 may preferably not perform the metadata mapping.

INAT 146 may perform a number of activities. The activities may include impact analysis, as shown at 158. Impact analysis 158 may determine the impact of each component of the enterprise infrastructure.

The activities may also include dependency analysis, as shown at 156. Dependency analysis 156 may determine the dependency of each component of the enterprise infrastructure—i.e., which components depend on which other components.

The activities may also include incident notification 154. Incident notification 154 may notify users and/or stakeholders of an enterprise infrastructure when an incident occurs. An incident may be a power outage, natural disaster, internet failure or any other suitable incident. The incident may affect the operability of one or more components of the enterprise infrastructure. Many other components, which did not incur an outage, may be affected as well. This may be because the operable components may depend in some fashion on the inoperable components.

In certain embodiments, incident notification 154 may transmit a notification to the affected stakeholders. This may assist the stakeholders to understand, for example, why certain capabilities are unavailable at a certain time.

The activities may also include weekend maintenance planning 152. INAT 146 may utilize dependency analysis 156 and impact analysis 158 to determine the most opportune schedule—e.g., least impactive—time for weekend maintenance.

The activities may also include infrastructure capacity planning 150. INAT 146 may utilize dependency analysis 156 and impact analysis 158 to determine when and how to change the enterprise infrastructure. The changes may include adding additional regions, data centers, data center components, application servers or any other suitable infrastructure inventory components. The changes may also include removing any suitable component from an enterprise infrastructure. The changes may also include changing the architecture of any suitable portion of the enterprise infrastructure.

The activities may include disaster recovery planning, as shown at 148. Disaster recovery planning 148 may include determining all the in scope infrastructure components of the particular data center, region and/or location, and the impact of their unavailability. Disaster recovery planning 148 may also determine the available infrastructure resources to handle the enterprise in the event of any disaster and in what manner the enterprise infrastructure can be restored with minimum enterprise impact.

Figure 2:
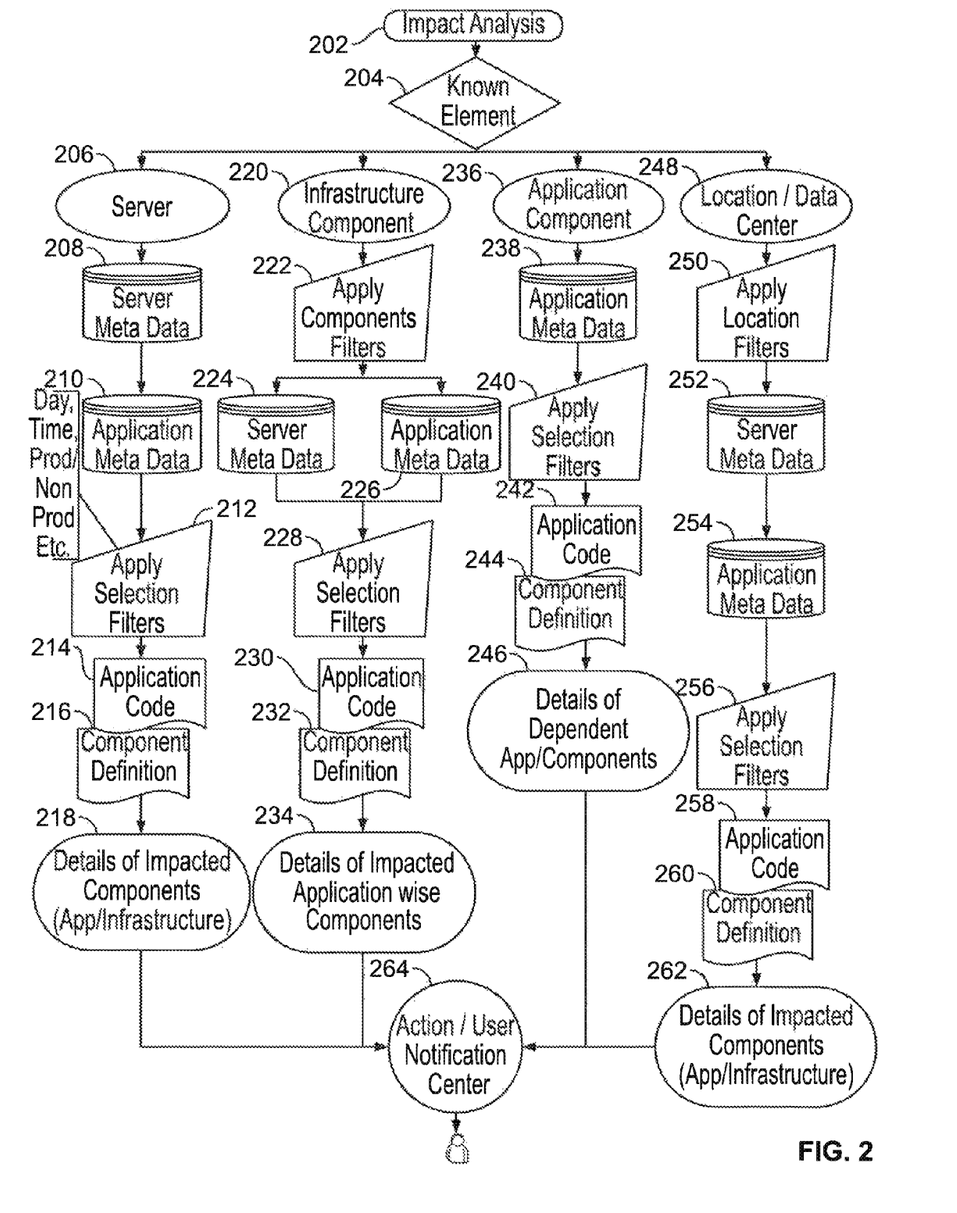
FIG. 2 shows an illustrative flow chart in accordance with principles of the invention.

FIG. 2 shows a flow chart. The flow chart may begin at 202, Impact Analysis. In order to determine the impact of an outage, the first step may be to identify the known element, or the element which has faced service disruptions shown at 204. The example of the known element may be an application service, database server or a complete data center due to a disaster event.

In the event that the known element is a server, as shown at 206, the process may proceed to 208. The impact notification center may retrieve data from a server metadata database, as shown at 208. The data may be dependencies and relationships of the known element—i.e., the server. The data may also be the demographic details of the server as well as the services being hosted on it. Demographic details may include the server geographical presence, data center location, etc., while the server may host different services, for example, databases, application web services, grid services etc.

The impact notification center may also retrieve data from an application metadata database, as shown at 210. The data may be the applications which are mapped to the infrastructure components that are impacted by the server.

The impact notification center may have provision to apply selection filters to the retrieved data, as shown at 212. The selection filters may include day, time, production or non-production environments, etc. The selection filters may narrow the scope of the dependencies of the known element—e.g., a server. The selection filters may gauge the impact of the outage. The impact notification center may access application code 214 and component definition 216 to further narrow down the impacted application services.

The impact notification center may determine, based on the retrieved data, details of impacted components, as shown at 218. The impacted components may be applications, application processes, infrastructure or any other suitable components.

In the event that the known element is an infrastructure component, the process may proceed to step 220. One infrastructure component—e.g., a server—may host multiple infrastructure components. In the event that the known element is an infrastructure component, a filter may be applied to separate a distinct infrastructure component from the remaining infrastructure components, as shown at 222.

The impact notification center may retrieve server mapping details from the server metadata database, as shown at 224. The impact notification center may also retrieve a list of applications dependent on the infrastructure component from the application metadata database, as shown at 226. Selection filters may be applied, as shown at 228. The selection filters may narrow the scope of the dependencies, thereby gauging the effect of the outage. The selection filters may include day, time, production/non-production environments as shown at 228. The impact notification center may access application code 230 and component definition 232 to further narrow down the impacted application services.

The impact notification center may determine, based on the retrieved data, details of impacted components, as shown at 234. The impacted components may be applications, application processes, infrastructure, or any other suitable components.

In the event that the known element is an application component, the process may proceed to step 236. An application component may be a service. The service may be provided by an application. The unavailability of the application may impact numerous systems—i.e., the service. The dependencies for the application component may be derived from the application metadata database, as shown at 238.

Selection filters may be applied, as shown at 240. The selection filters may narrow the scope of the dependencies, thereby gauging the effect of the outage. The selection filters may relate to day, time and/or production/non-production environments as shown at 240. The impact notification center may access application code 242 and component definition 244 to further narrow down the impacted application services, application components, or any other suitable components.

The impact notification center may determine, based on the retrieved data, details of impacted components, as shown at 246. The impacted components may be applications, application services, infrastructure, or any other suitable components.

In the event that the known element is a location and/or data center, the process may proceed to step 248. Location filters may be applied, as shown at 250. Location filters may limit the search to a region, data center, or any other suitable location. The impact notification center may retrieve a list of servers, infrastructure components, applications, application components and any other suitable components, which relate to the specified location from the server metadata database, as shown at 252.

The impact notification center may also retrieve a list of dependent applications from the application metadata database. The retrieval may be based on the infrastructure components.

Selection filters may be applied, as shown at 256. The selection filters may narrow the scope of the dependencies, thereby gauging the effect of the outage. The selection filters may include day, time and/or production/non-production environments as shown at 256. The impact notification center may access application code 258 and component definition 260 to further narrow down the impacted application services.

The impact notification center may determine, based on the retrieved data, details of impacted components, as shown at 262. The impacted components may be applications, application services, infrastructure, or any other suitable components.

In some embodiments the impact notification center will also retrieve user and/or stakeholder information. The stakeholders and/or users may be notified of the impact, as shown at 264. The users and/or stakeholders may also be enabled to perform any suitable action upon receipt of the notification. The actions may include rerouting internet connections, rerouting data transmissions, retransmitting relevant data, transmitting a message to repair crew and/or any other suitable actions.

Figure 3:
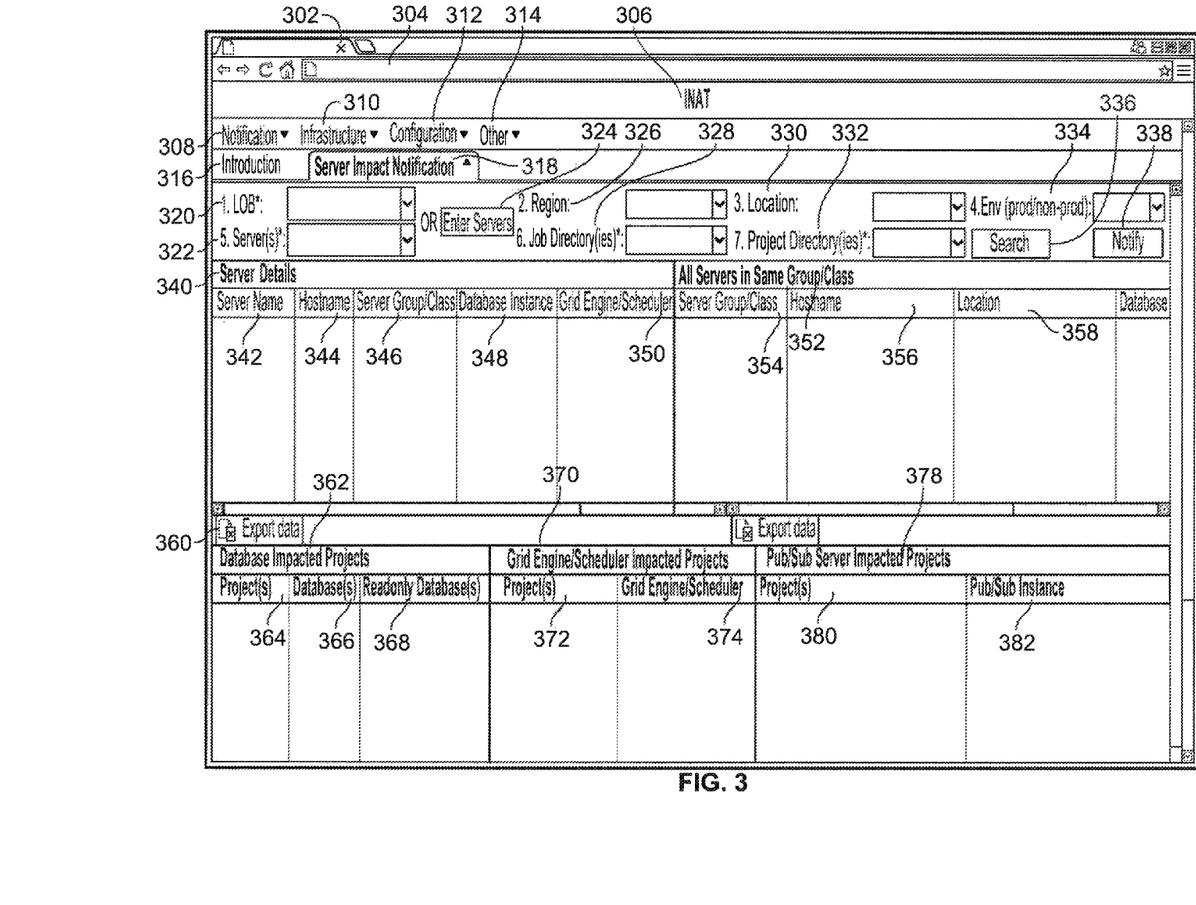
FIG. 3 shows an illustrative graphical user interface ("GUI") in accordance with an embodiment of the invention.

FIG. 3 shows an illustrative GUI. Webpage 302 may include address bar 304. The address included in address bar 304 may be an internal address—i.e., an intranet address. The address included in address bar 304 may also be an external address—i.e., an Internet address.

Webpage 302 may also include header 306. Header 306 may be INAT. INAT may be an acronym for Impact Notification and Analysis Tool. The GUI may provide impact notification and analysis for an enterprise infrastructure, as described above in FIGS. 1 and 2.

Webpage 302 may include notification tab 308, infrastructure tab 310, and other tab 314. Webpage 302 may also include introduction tab 316.

Webpage 302 may also include Server Impact Notification tab 318.

FIG. 3 shows INAT's server impact notification tab, which may be used when the known element is a server or geographic location. This may be the case in a disaster recovery event.

Server notification tab 318 may include numerous text entry fields. The text entry fields may enable a user to enter the known element, as described in FIG. 2 and thereby gauge an impact on an enterprise infrastructure. It should be appreciated that any of the described text entry fields may be fillable fields, drop-down boxes, radio buttons, multiple select drop-down options or any other suitable method for entering data.

Server impact notification tab 318 may include a multiple select drop-down option 320. Drop-down option 320 may provide options to accept an LOB ("Line of Business") entry, which may get populated based on the data available from the server metadata database. The star to the right of LOB may indicate that the LOB field is a required field. It may not be necessary to have the LOB field as a mandatory item, although when the LOB field is used, it may be helpful to narrow down the in scope servers which may get populated under field 322.

The server impact notification tab 318 may also include multiple select drop-down option 326. Drop-down option 326 may provide the list of regions as per the distribution of the servers for the selected LOB(s), for e.g. AMRS (Americas), EMEA (Europe, Middle East and Africa) and APAC (Asia Pacific). The provision of region selection helps to narrow down the in scope servers and may also be used in case of any outage having a regional impact.

The server impact notification tab 318 may also include multiple select drop-down option 330. The drop-down option 330 may provide the list of all the data centers as per the distribution of the servers for the selected LOB(s) and/or region for e.g., New York, London, Zurich, Hong Kong etc. The provision of data center selection may help to narrow down the in scope servers and may also be used in case of a specific data center outage.

The server impact notification tab 318 may also include multiple select drop-down option 334. Drop-down option 334 may accept production environment, non-production environment or both. A user may select "prod" to indicate that the filter may include only production servers. A user may also select "non-prod" to indicate that the filter may include only non-production servers. A user may also select all, to indicate that the filter may include all servers.

Server impact notification tab 318 may also include multiple select drop-down entry field 322. Drop-down option 322 may list all the servers based on the mandatory LOB selection and/or other geographical filters. Drop-down option 322 may allow the user to select the server(s). The star to the right of server(s), as shown at 322, may indicate that the server(s) field is a required field, in order for INAT to derive the impacted components.

A user may also click on enter servers button 324. Enter servers button 324 may be an alternative way of selecting servers. Clicking on enter servers button 324 may open a window where a user may directly copy and/or paste multiple servers from a Microsoft Excel or Word document instead of selecting the servers one by one from the multiple select drop-down, as shown at 322. Server impact notification tab 318 may also include multiple select drop-down option 328. Drop-down option 328 may accept job (application processes) directory(ies) information. The directory information may be used to read the definition of all the jobs under the selected directories. The directory information may also be used to find the impacted jobs depending upon the impacted servers from options 322 or 324. The star to the right of Job Directory(ies) option 328 may indicate that it may be a mandatory field in order to get the impacted components based on the known element for example, a server(s).

Server impact notification tab 318 may also include multiple select drop-down option 328. Drop-down option 328 may accept Project (application code) directory(ies) information. The directory information may be used to scan the application code under the selected directories. The directory information may also be used to find the server usage, depending upon the impacted servers, from options 322 or 324. The star to the right of Project Directory(ies) option 332 may indicate that Project Directory(ies) option 332 may be a mandatory field in order to get the impacted components based on the known element—e.g., a server(s). Server impact notification tab 318 may also include search button 336. When a user clicks on search button 336, the system may retrieve the relevant data as to which application components of an enterprise will be affected by the selected server(s) as per the filter provided.

Server impact notification tab 318 may include notify button 338. When a user clicks on notify button 338, it may open a notify panel which may be used to customize the notification message which may be used to notify all the stakeholders who will be affected by an outage of the entered components.

Server impact notification tab 318 may include Server Details box 340. After a user has selected the in scope servers according to the LOB, region, location filters, provided job directory(ies) which enable searching of the job definitions and project directory(ies), the server details box 340 may include all the information about the impacted servers. Server details box 340 may include column 342—server name, column 344—host name, column 346—server group/class, column 348—database instance, column 350—grid engine/scheduler and any other suitable column. Server details box 340 may include export data button 360. Export data button 360 may enable a user to export the data presented in server details box 340. For example, the data may be exported to a Microsoft Office Excel® spreadsheet.

Server impact notification tab 318 may include "All Servers in same group/class" box 352. After a user has selected the in scope servers according to the LOB, region, location filters, provided job directory(ies) which enable searching of job definitions, and project directory(ies) the "all server in same group/class" box 352 may include information about impacted servers which are in the same class as the entered server. "All servers in same group/class" box 352 may include column 354—server group/class, column 356—host name, column 358—location and any other suitable columns.

Server impact notification tab 318 may include database impacted projects box 362. After a user has selected the in scope servers according to the LOB, region, location filters and provided job directories which enable searching of the the job definitions and project directory(ies), database impacted projects box 362 may include information about projects which may get impacted by the servers which are hosting database instance and are in scope of the outage. Database impacted projects box 362 may include column 364—project(s), column 366—database(s), column 368—read-only database(s) and any other suitable columns.

Server impact notification tab 318 may include grid engine/scheduler impacted projects box 370. After a user has selected the in scope servers according to the LOB, region, location filters and provided job directories which enable searching of the job definitions and project directory(ies), grid engine/scheduler impacted projects box 370 may include information about projects which are impacted by the servers which are hosting grid engines/schedulers and are in scope of the outage. Grid engine/scheduler impacted projects box 370 may include column 372—projects, column 374—Grid Engine/scheduler and any other suitable columns.

Server impact notification tab 318 may include publish/subscribe server impacted projects box 378. After a user has selected the in scope servers according to the LOB, region, location filters and provided job directories which enable searching of the job definition and project directory(ies), publish/subscribe server impacted projects box 378 may include information about the projects which are impacted by the servers which are hosting publish/subscribe services and are in scope of the outage. Publish/subscribe server impacted projects box 378 may include column 380—project(s), column 382—publish/subscribe instance(s) and any other suitable columns.

Figure 4A:
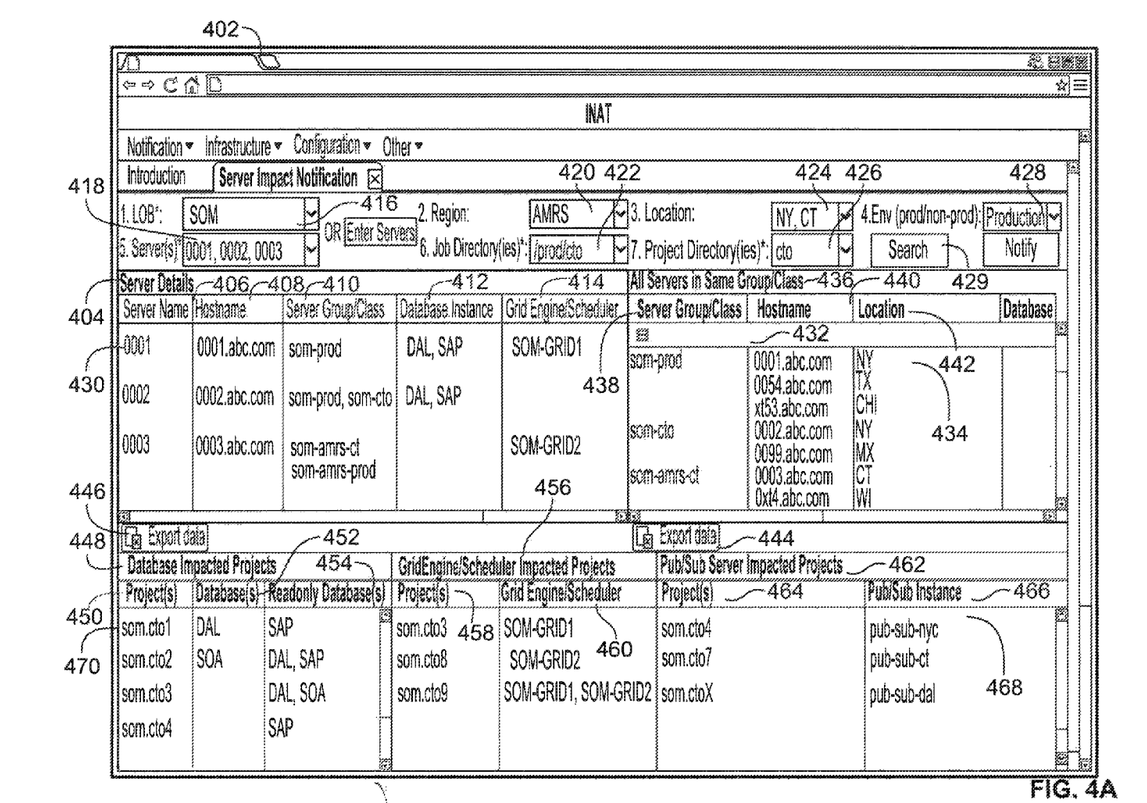
FIG. 4A shows an illustrative GUI in accordance with an embodiment of the invention.
Figure 4B:
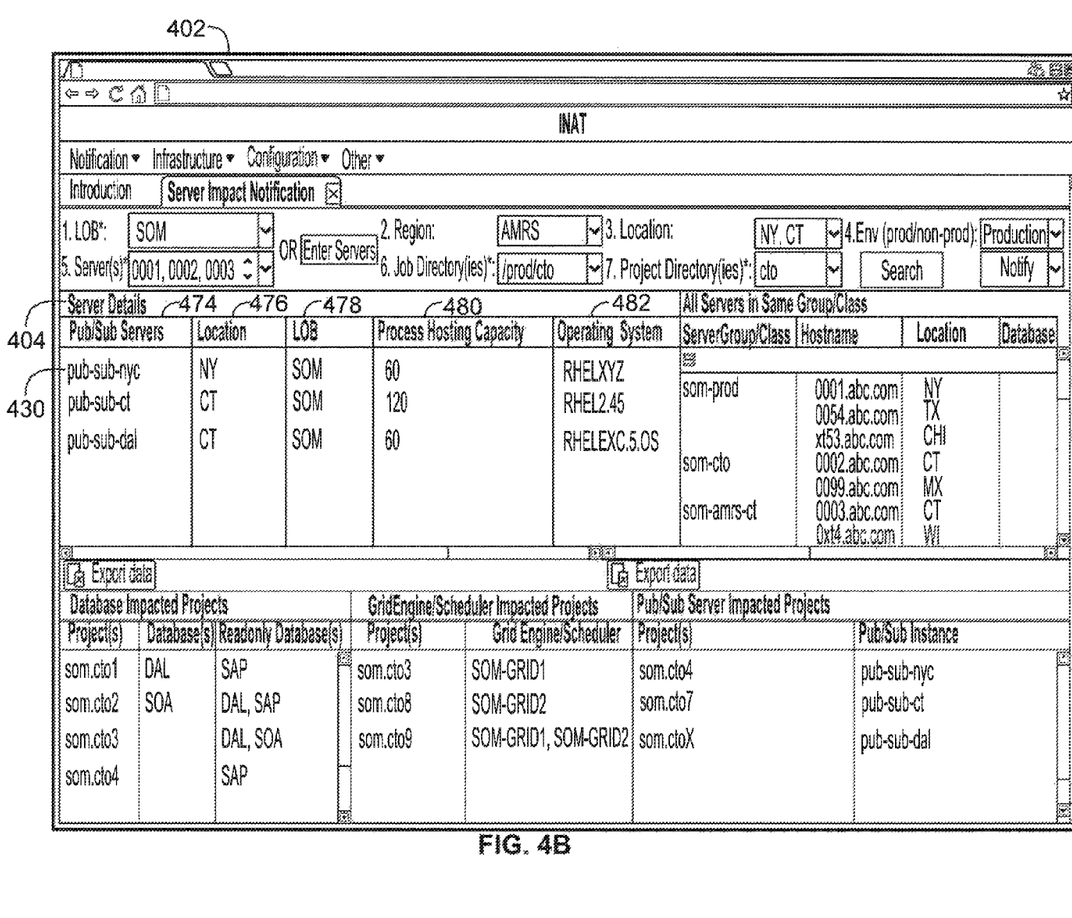
FIG. 4B shows an illustrative GUI in accordance with an embodiment of the invention.

FIGS. 4A and 4B shows a GUI Webpage 402. GUI webpage 402 shown on FIGS. 4A and 4B is similar to GUI webpage 302 shown on FIG. 3. In FIGS. 4A and 4B, though, a user has selected filters from the multiple select options fields. In LOB entry field 416, a user selected "SOM". In region entry field 420, a user selected "AMRS". In location selection field 424, a user selected "NY" and "CT". In prod/non-prod entry field 428, a user selected "Production". In server(s) entry field 418, a user selected "0001, 0002, 0003". In job directory(ies) entry field 422, a user selected "/prod/cto". In project directory(ies) entry field 426, a user entered "cto". After clicking search button 429, the system may present a list of impacted components, as described below.

Server Details box 404 may include column 406—server name, column 408—host name, column 410—server group/class, column 412—database instance, column 414—grid engine/scheduler, column 474—publish/subscribe server (viewable on FIG. 4B), column 476—location (viewable on FIG. 4B), column 478—LOB (viewable on FIG. 4B), column 480—process hosting capacity (viewable on FIG. 4B), column 482—operating system (viewable on FIG. 4B) and any other suitable column.

Row 430 shows a server which may have been impacted. The server name may be "0001", the server host name may be 0001.abc.com, the server group/class may be "som-prod", the server also host publish/subscribe server "pub-sub-ny" (viewable on FIG. 4B), the location may be "NY" (viewable on FIG. 4B), the LOB may be "SOM" (viewable on FIG. 4B), the process hosting capacity may be "60" (viewable on FIG. 4B) and the operating system may be "RHELXYZ" (viewable on FIG. 4B).

"All servers in same group/class" box 436 may include column 438—server group/class, column 440—host name, column 442—location and any other suitable column. Information about server 0001 may be shown at 432. Row 434 shows an exemplary portion of information about server 0001. Row 434 shows class "som-prod", hostname 0001.abc.com, location NY and any other suitable information.

Database impacted projects box 448 may include column 450—project(s), column 452—database(s), column 454—read-only database(s) and any other suitable column. Row 470 may show an exemplary impacted database project. Row 470 may shows project "som.cto7" which may associated with read-only database instance "SAP" may be impacted. Grid Engine/Scheduler impacted projects box 456 may include column 458—project(s), column 460—Grid/Engine Scheduler and any other suitable column.

Publish/subscribe server impacted projects box 462 may include column 464—project(s), column 466—publish/subscribe server instance(s) and any other suitable column. Row 468 may show project "som.cto4", which may be associated with publish/subscribe instance "pub-sub-ny" may be impacted.

Figure 5:
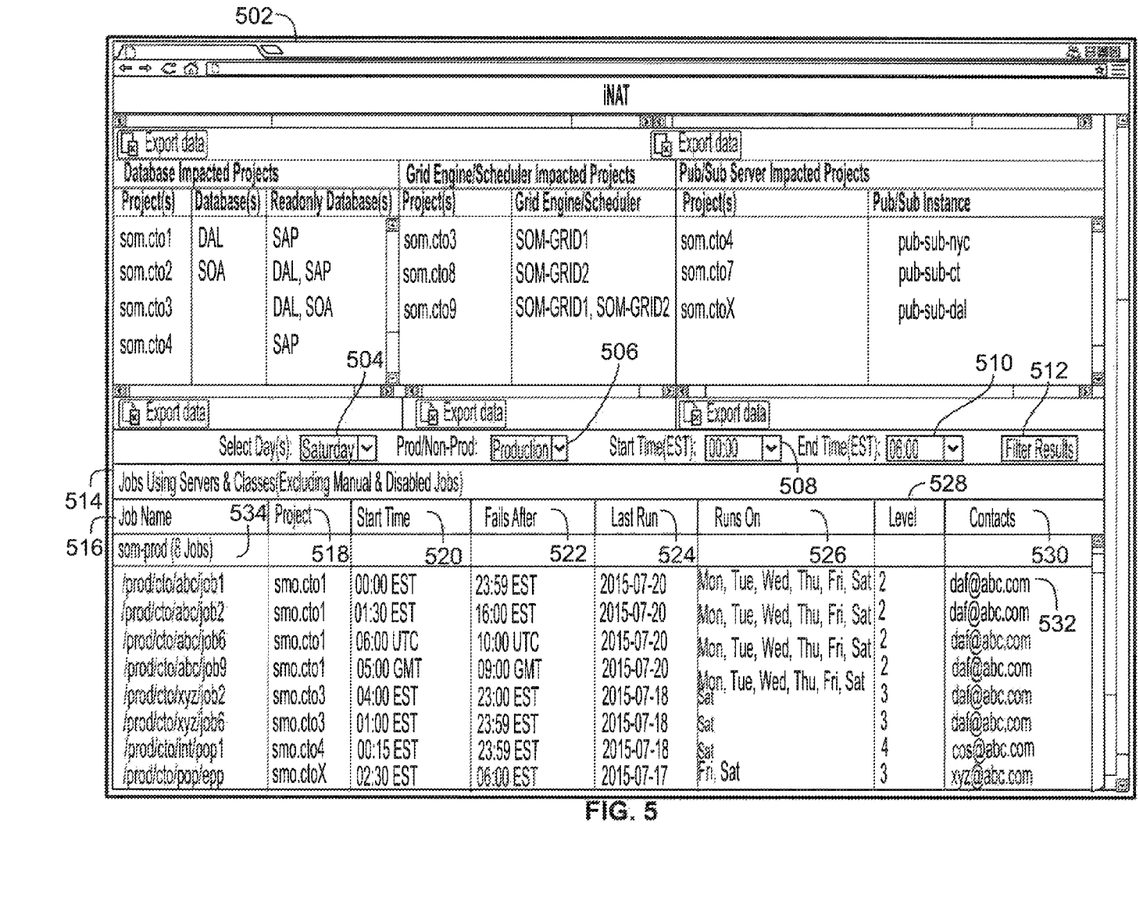
FIG. 5 shows an illustrative GUI in accordance with an embodiment of the invention.

FIG. 5 shows GUI webpage 502. GUI webpage 502 is similar to GUI webpage 402, shown in FIGS. 4A and 4B. In FIGS. 4A and 4B, the upper portion of webpage 402 was viewable; in FIG. 5, the lower portion of webpage 502 may be viewable.

"Jobs using server and group/class" box 514 may include jobs that may be impacted. Jobs box 514 may include column 516—job name, column 518—project, column 520—start time, column 522—fails after, column 524—last run, column 526—runs on, column 528—level (priority level), column 530—contacts and any other suitable column.

Row 532 shows an exemplary job that may be impacted. The jobs impact box is grouped by the jobs running on the impacted group/class. The job name may be "prod/cto/abc/job1". Job "prod/cto/abc/job1" may be associated with "som-prod" class, as shown at 534. Job "prod/cto/abc/job1" may be associated with project "smo.cto1". Job "prod/cto/abc/job1" may start at 00:00 eastern standard time. Job "prod/cto/abc/job1" may fail after 23:59 eastern standard time. The last run of job "prod/cto/abc/job1" may be Jul. 20, 2015. Job "prod/cto/abc/job1" may run on Monday, Tuesday, Wednesday, Thursday, Friday and Saturday. The priority level of job "prod/cto/abc/job1" may be low, which may be indicated by the numerical value two (assuming the lower the number, the higher would be its priority). The contact information for job "prod/cto/abc/job1" may be daf@abc.com.

In some embodiments, a user may gauge the impact of an outage using selection filters, as described above in connection with FIG. 4. Entry field 504 may accept input from a user pertaining to a day or days of a week. Entry field 506 may accept user input pertaining to production or non-production environments. Entry field 508 may accept user input pertaining to a start time of an outage. Entry field 510 may accept user input pertaining to an end time of an outage. Filter results button 512 may enable a user to begin the determination.

A user has selected Saturday, as shown at 504. A user has selected a production environment, as shown at 506. A user has elected a start time of 00:00 eastern standard time, as shown at 508. A user has selected an end time of 2:00 eastern standard time, as shown at 510. A user has selected the button "filter results".

It should be appreciated that there are only 8 jobs running on "som-prod" class/server group on Saturday between 00:00 eastern standard time to 06:00 eastern standard time, which may be less than if there was no filtering. This may be because the filtering limited which impacted components will be identified as impacted.

Figure 6:
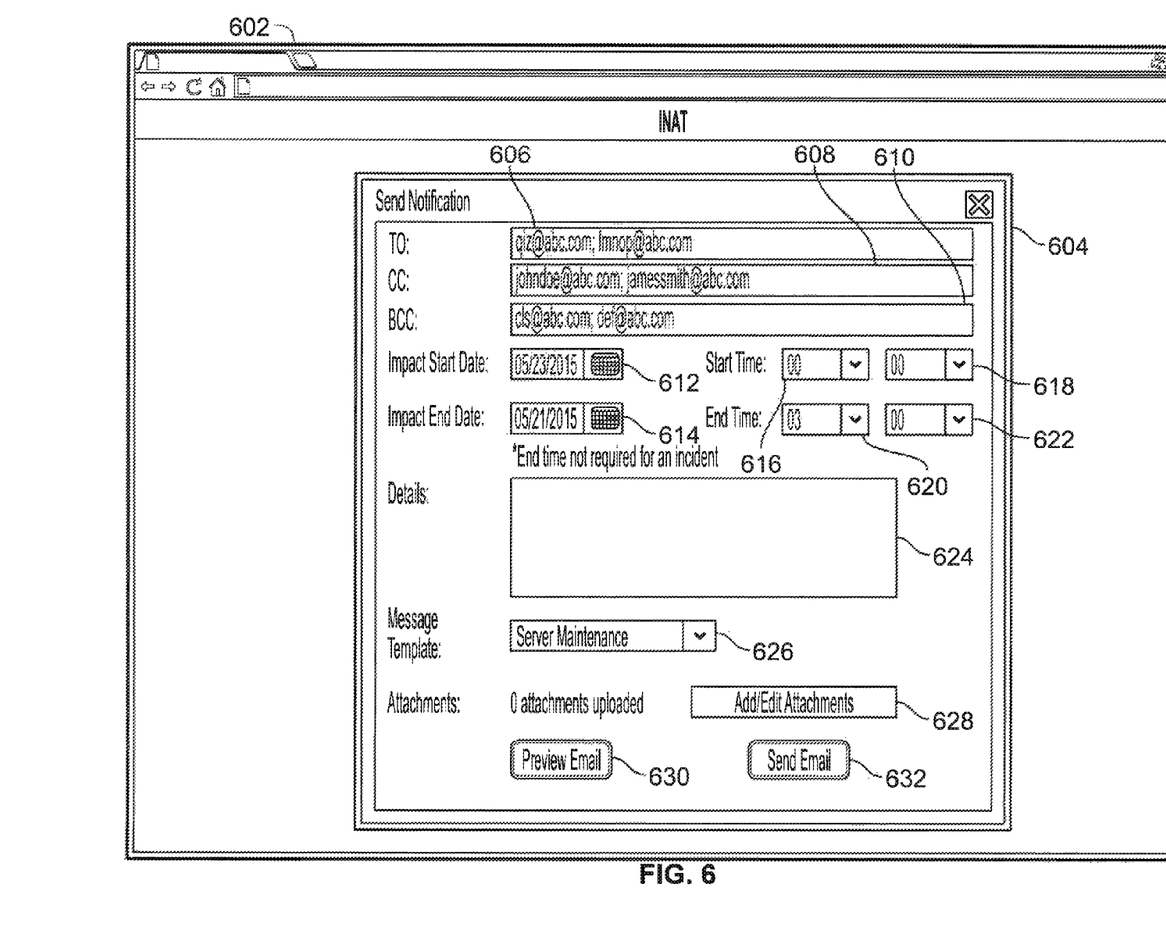
FIG. 6 shows an illustrative GUI in accordance with an embodiment of the invention.

FIG. 6 shows GUI webpage 602. GUI webpage 602 may be a webpage which allows a user to send notification of an outage to stakeholders of impacted components. Send notification box 604 may include email address entry box 606. Email address entry box 606 may be auto-populated by the impact notification center. Email address box 606 may be user entered or a combination of auto-populated and user entered. Email address, qiz@abc.com, lmnop@abc.com, johndoe@abc.com, jamessmith@abc.com, cls@abc.com and def@abc.com may be email addresses of contacts associated with the impacted components.

Email address entry field 608 and email address entry field 610 may include email addresses of contacts who may be copied (CC) or blind copied (BCC) on the email. Email address entry fields 608 and 610 may also be auto-populated and/or user entered.

Date entry field 612 may show the start date of the impact. Hour entry field 616 may show the start hour of the impact. Minute entry field 618 may show the start minute of the impact. Date entry field 614 may show the end date of the impact. Hour entry field 620 may show the end hour of the impact. Minute entry field 622 may show the end minute of the impact. Fields 612, 614, 616, 618, 620 and 622 may show be auto-populated, user inputted or a combination of both. It should be noted that in the event of an unplanned outage, the end date, time and hour need not be entered.

Text entry field 624 may accept user input pertaining to details of an outage. For example, a user may input "The outage is due to Hurricane Sandy—we are sorry for the inconvenience."

Text entry field 626 may accept user input pertaining to which message template the user would like to select. The system may include a number of different message templates for different types of outages. For example, a user may choose from server maintenance, power outage, natural disaster or any other suitable template.

Button 628 may allow a user to add or edit attachments. Button 630 may enable a user to preview the email before it is transmitted. Button 632 may enable a user to send the email.

Figure 7A:
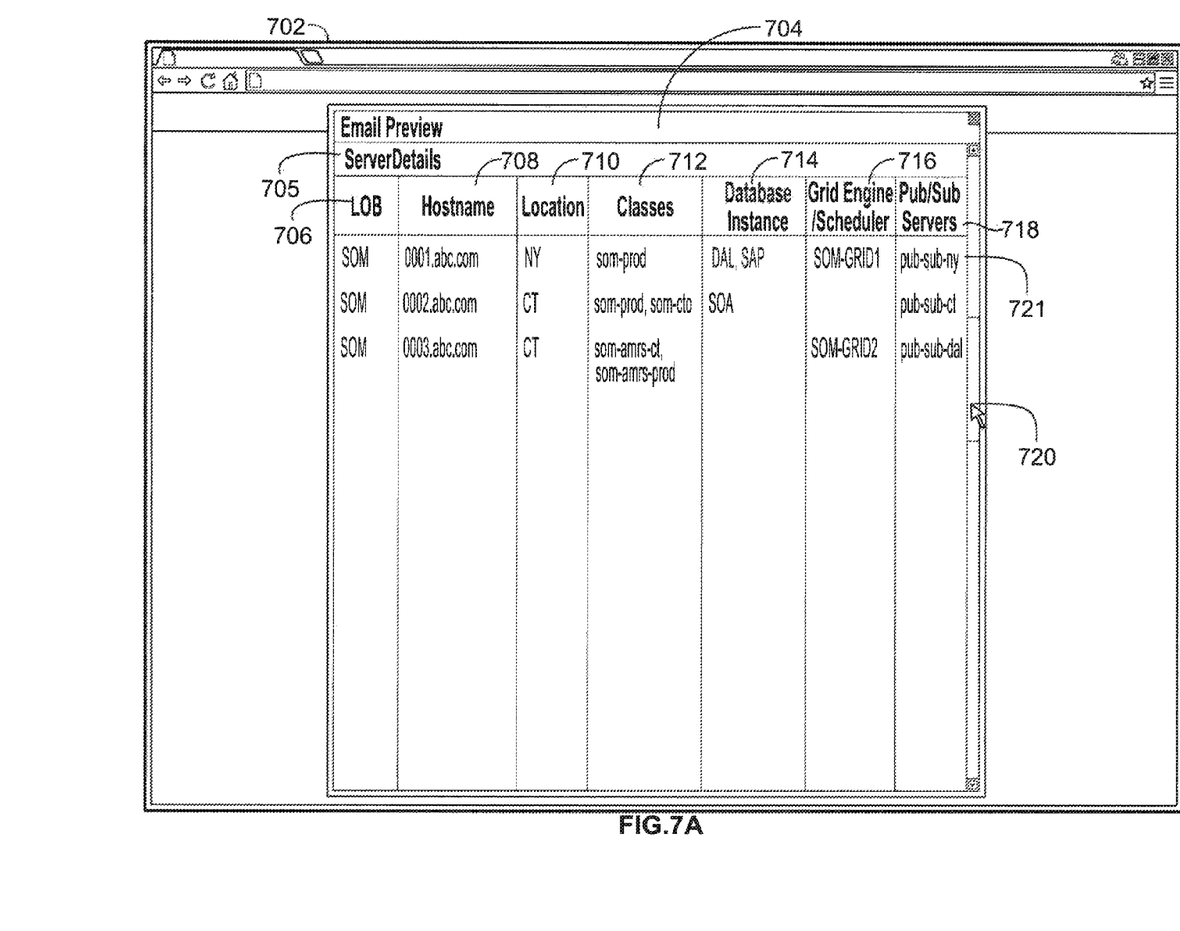
FIG. 7A shows an illustrative GUI in accordance with an embodiment of the invention.
Figure 7B:
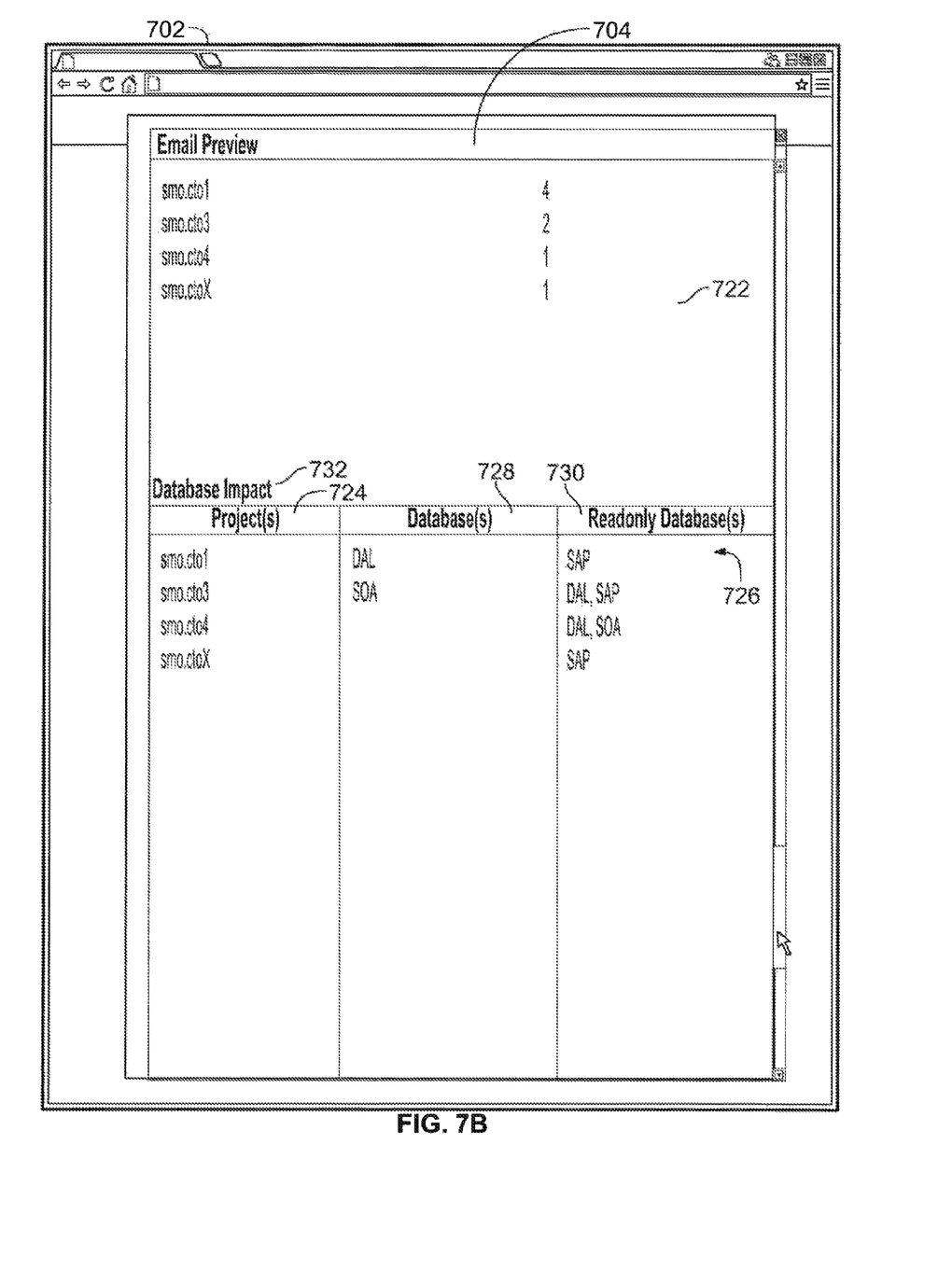
FIG. 7B shows an illustrative GUI in accordance with an embodiment of the invention.

FIGS. 7A and 7B show GUI webpage 702. The user of webpage 602, shown in FIG. 6, may have chosen button 630, which may enable a user to view an email preview. Webpage 702 may include email preview 704. Webpage 702 may also include cursor 720.

Email preview 704 may include information pertaining to the outage. Email preview 704 may include server details 705. Server details 705 may include LOB column 706. The LOB shown at 721 may be "SOM". Server details 705 may include host name column 708. The host name shown at 721 may be "0001.abc.com". Server details 705 may include location column 710. The location shown at 721 may be "NY". Server details 705 may include classes column 712. The class shown at 721 may be "som-prod". Server details 705 may include database instance column 714. The database instances shown at 721 may be DAL and SAP. Server details 705 may include grid engine/scheduler column 716. The Grid Engine/Scheduler shown at 721 may be "SOM-GRID1". Server details 705 may include publish/subscribe server column 718. The publish/subscribe server shown at 721 may be "pub-sub-ny".

Email preview 704 may include database impact 732 (viewable on FIG. 7B). Database impact may include project(s) column 724, database(s) column 728, Read-only database(s) column 730 and any other suitable column. Row 726 may be an exemplary project that is included in database impact. The exemplary project "smo.cto1" may be using database DAL. The exemplary project "smo.cto1" may be using database "SAP" for read-only purpose.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

Thus, methods and apparatus for an impact notification system are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for notifying, in the event of a power outage, a plurality of stakeholders of an enterprise infrastructure, the system comprising:
   a region comprising a plurality of data centers, wherein:
   each data center comprises a plurality of data center components;
   each data center component is associated with a plurality of application;
   each application, included in the plurality of applications is associated with at least one data center component;
   each application, included in the plurality of applications, is associated with a plurality of users, said plurality of users included in the plurality of stakeholders;
   each user, included in the plurality of users, is associated with at least one application, included in the plurality of applications;
   each application, included in the plurality of applications, is associated with a plurality of user interfaces ("UIs");
   each application, included in the plurality of applications, is associated with a plurality of processes;
   a server metadata database which receives metadata from each data center component of each data center, the metadata identifies the associated applications;
   an application metadata database which receive metadata from each application, the metadata identifying the associated UIs, processes, and users;
   an impact notification center comprising:
   a reader that reads the metadata from the server metadata database and the metadata from the application metadata database; and
   a processor that maps the metadata from the server metadata database with the metadata from the application metadata database;
   when an application, included in the plurality of applications, experiences a power outage, the impact notification center is configured to transmit an impact notification message, said impact notification message which characterizes the effect of the power outage on the remaining components of the system, to the stakeholders which are associated with the application that has experienced the power outage.

2. The system of claim 1, wherein the data center components comprise:
   a plurality of application servers;
   a plurality of databases;
   a plurality of publish/subscribe servers; and
   a plurality of grid engines/schedulers.

3. The system of claim 1, wherein when a data center component, included in the plurality of data center components, experiences a data center component power outage, the impact notification center is configured to transmit an impact notification message, said impact notification message which characterizes the effect of the data center component power outage on the remaining components of the system, to the stakeholders which are associated with the data center component that has experienced a data center component power outage.

4. The system of claim 1, wherein the characterization includes identifying the date and time that the power outage occurred.

5. The system of claim 1, wherein the impact notification message includes a start time of the power outage.

6. The system of claim 1, wherein the characterization includes identifying whether the application that experienced a power outage is associated with a production environment or a non-production environment.

7. The system of claim 1, wherein the system identifies the component or group of components that experienced a power outage based on the metadata mapping.

8. The system of claim 7, wherein the system determines which components were affected by the power outage based on the identification.

9. A system for notifying, in the event of a scheduled maintenance downtime, a plurality of stakeholders of an enterprise infrastructure, the system comprising:
   a region comprising a plurality of data centers, wherein:
   each data center comprises a plurality of data center components;
   each data center component is associated with a plurality of application;
   each application, included in the plurality of applications, is associated with at least one data center component;

each application, included in the plurality of applications, is associated with a plurality of users, said plurality of users included in the plurality of stakeholders;

each user, included in the plurality of users, is associated with at least one application, included in the plurality of applications;

each application, included in the plurality of applications, is associated with a plurality of user interfaces ("UI's");

each application, included in the plurality of applications, is associated with a plurality of processes;

a server metadata database which receives metadata from each data center component of each data center, the metadata identifies the associated applications;

an application metadata database which receive metadata from each application, the metadata identifying the associated UIs, processes, and users;

an impact notification center comprising:
- a receiver that receives the metadata from the server metadata database and the metadata from the application metadata database; and
- a processor that maps the metadata from the server metadata database with the metadata to the application metadata database;

wherein:
when an application, included in the plurality of applications, is scheduled to incur maintenance downtime, the impact notification center is configured to transmit an impact notification message, said impact notification message which characterizes the effect of the maintenance downtime on the remaining components of the system, to the stakeholders which are associated with the application that has experienced scheduled maintenance downtime.

10. The system of claim 9, wherein the data center components comprise:
- a plurality of application servers;
- a plurality of databases;
- a plurality of publish/subscribe servers; and
- a plurality of grid engines/schedulers.

11. The system of claim 9, wherein the characterization includes identifying the date and time that the maintenance downtime is scheduled.

12. The system of claim 9, wherein the impact notification message includes a start time of the maintenance downtime.

13. The system of claim 9, wherein the characterization includes identifying whether the application that will incur maintenance downtime is associated with a production environment or a non-production environment.

14. The system of claim 9, wherein the system identifies the component or group of components that incurred scheduled maintenance downtime based on the metadata mapping.

15. The system of claim 7, wherein the system determines which components will be affected by the maintenance downtime based on the identification.

16. The system of claim 9, wherein when a data center component, included in the plurality of data center components, is scheduled to incur a second maintenance downtime, the impact notification center is configured to transmit an impact notification message, said impact notification message which characterizes the effect of the second maintenance downtime on the remaining components of the system, to the stakeholders which are associated with the data center component that has experienced the second scheduled maintenance downtime.

17. One or more non-transitory computer readable media having code stored thereon which, when executed by a processor on a computer system, performs a method for notifying, in the event of a power outage, a plurality of stakeholders of an enterprise infrastructure, said enterprise infrastructure comprising a plurality of components and a plurality of relationships between the components, the components comprising a plurality of data centers, a plurality of data center components, a plurality of applications and a plurality of application components, the relationships comprising, a plurality of relationships between the plurality of data centers and the plurality of data center components, a plurality of relationships between the plurality of data center component and the plurality of applications, a plurality of relationships between the plurality of applications and the plurality of stakeholders, and a plurality of relationships between the plurality of applications and the plurality of application components, the method comprising:

receiving information, said information pertaining to a power outage of a component of the enterprise infrastructure, at an impact notification center;

determining, at the impact notification center, the effect of the power outage on remaining components of the enterprise infrastructure, the determining comprising:
- identifying the relationships between all of the components of the enterprise inventory;
- storing the identified relationships which are associated with applications in an application metadata database;
- storing the identified relationships which are associated with the data center components in a server metadata database;
- utilizing the application metadata database and the server metadata database to identify all the relationships of the component which incurred a power outage;
- based on the identified relationships, identifying the components which were affected by the power outage;

notifying the stakeholders, via a notification e-mail, of the power outage and the identified components.

* * * * *